(12) United States Patent
Lee et al.

(10) Patent No.: US 11,785,525 B2
(45) Date of Patent: *Oct. 10, 2023

(54) PATH SELECTION FOR INTEGRATED ACCESS AND BACKHAUL

(71) Applicant: Verizon Patent and Licensing Inc., Basking Ridge, NJ (US)

(72) Inventors: Jay J. Lee, San Ramon, CA (US); Taher Farkhondeh, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,933

(22) Filed: May 17, 2022

(65) Prior Publication Data

US 2022/0279419 A1    Sep. 1, 2022

Related U.S. Application Data

(63) Continuation of application No. 16/994,730, filed on Aug. 17, 2020, now Pat. No. 11,356,922.

(51) Int. Cl.
| | | |
|---|---|---|
| *H04W 40/22* | (2009.01) | |
| *H04W 40/12* | (2009.01) | |
| *H04L 45/128* | (2022.01) | |
| *H04L 45/12* | (2022.01) | |
| *H04L 45/302* | (2022.01) | |
| *H04W 84/04* | (2009.01) | |

(52) U.S. Cl.
CPC ........... *H04W 40/22* (2013.01); *H04L 45/124* (2013.01); *H04L 45/128* (2013.01); *H04L 45/306* (2013.01); *H04W 40/12* (2013.01); *H04W 84/047* (2013.01)

(58) Field of Classification Search
CPC ... H04W 40/22; H04W 40/12; H04W 84/047; H04W 28/02; H04W 28/0289; H04L 45/306; H04L 45/128; H04L 45/124
See application file for complete search history.

(56) References Cited

U.S. PATENT DOCUMENTS

| | | | |
|---|---|---|---|
| 6,493,317 B1 * | 12/2002 | Ma ...................... | H04L 47/2433 370/395.52 |
| 8,102,764 B2 | 1/2012 | Castelli et al. | |
| 10,009,781 B1 | 6/2018 | Wang et al. | |
| 2012/0184306 A1 | 7/2012 | Zou et al. | |
| 2014/0064082 A1 | 3/2014 | Yeung et al. | |

(Continued)

*Primary Examiner* — Mohamed A Kamara

(57) ABSTRACT

A method may include identifying paths from a user equipment (UE) device to an anchor station, determining that a first path corresponds to a direct wireless link to the anchor station and determining, in response to determining that the first path corresponds to a direct wireless link, a signal quality and a congestion associated with the direct wireless link. The method may also include selecting, in response to determining that the signal quality satisfies a signal quality threshold and the congestion satisfies a congestion threshold, the first path for the UE device to use when communicating with the anchor station. The method may further include identifying, in response to determining that the signal quality does not satisfy the signal quality threshold or the congestion does not satisfy the throughput threshold, another path for the UE device to use when communicating with the anchor station.

20 Claims, 7 Drawing Sheets

(56) References Cited

U.S. PATENT DOCUMENTS

| | | | |
|---|---|---|---|
| 2015/0257166 A1* | 9/2015 | Weizman | H04W 40/12 |
| | | | 455/452.2 |
| 2017/0013493 A1 | 1/2017 | Homchaudhuri et al. | |
| 2019/0150057 A1 | 5/2019 | Wang et al. | |
| 2021/0105787 A1 | 4/2021 | Park et al. | |

* cited by examiner

PATH SELECTION FOR INTEGRATED ACCESS AND BACKHAUL

RELATED APPLICATION

This patent application is a Continuation of U.S. application Ser. No. 16/994,730 filed on Aug. 17, 2020, titled "Path Selection for Integrated Access and Backhaul," the disclosure of which is hereby incorporated by reference herein in its entirety.

BACKGROUND INFORMATION

The use of Fifth Generation (5G) wireless networks, such as 5G New Radio (NR) networks, and other advanced networks provides increased bandwidths for user devices. However, using such networks requires the deployment of large numbers of wireless stations, making the networks very dense. Using wired backhaul to transport data from these wireless stations is costly. As a result, service providers may use wireless backhaul links to transport data from wireless stations to reduce costs. For example, an Integrated Access and Backhaul (IAB) network may include wireless stations that communicate with other wireless stations via wireless backhaul links until reaching an IAB anchor station to reduce the deployment costs of 5G networks.

DETAILED DESCRIPTION OF PREFERRED EMBODIMENTS

The following detailed description refers to the accompanying drawings. The same reference numbers in different drawings may identify the same or similar elements.

Implementations described herein provide systems and methods for selecting paths that include one or more wireless links from user equipment devices to an IAB anchor station. For example, a user equipment device may have a number of different paths including one or more hops to reach an IAB anchor station. In one exemplary implementation, the particular wireless path may be selected based on whether a direct link is available to the IAB anchor, as well as the channel quality and throughput for the direct link. In situations in which a direct link does not exist or the direct link does not have adequate channel quality or throughput, a path that includes multiple links may be selected. In such situations, the channel quality and throughput for each link may be determined before selecting the appropriate path. In this manner, a path selection process may identify possible problems in a network, such as poor signal quality and congestion, and route traffic around such problems.

Figure 1:
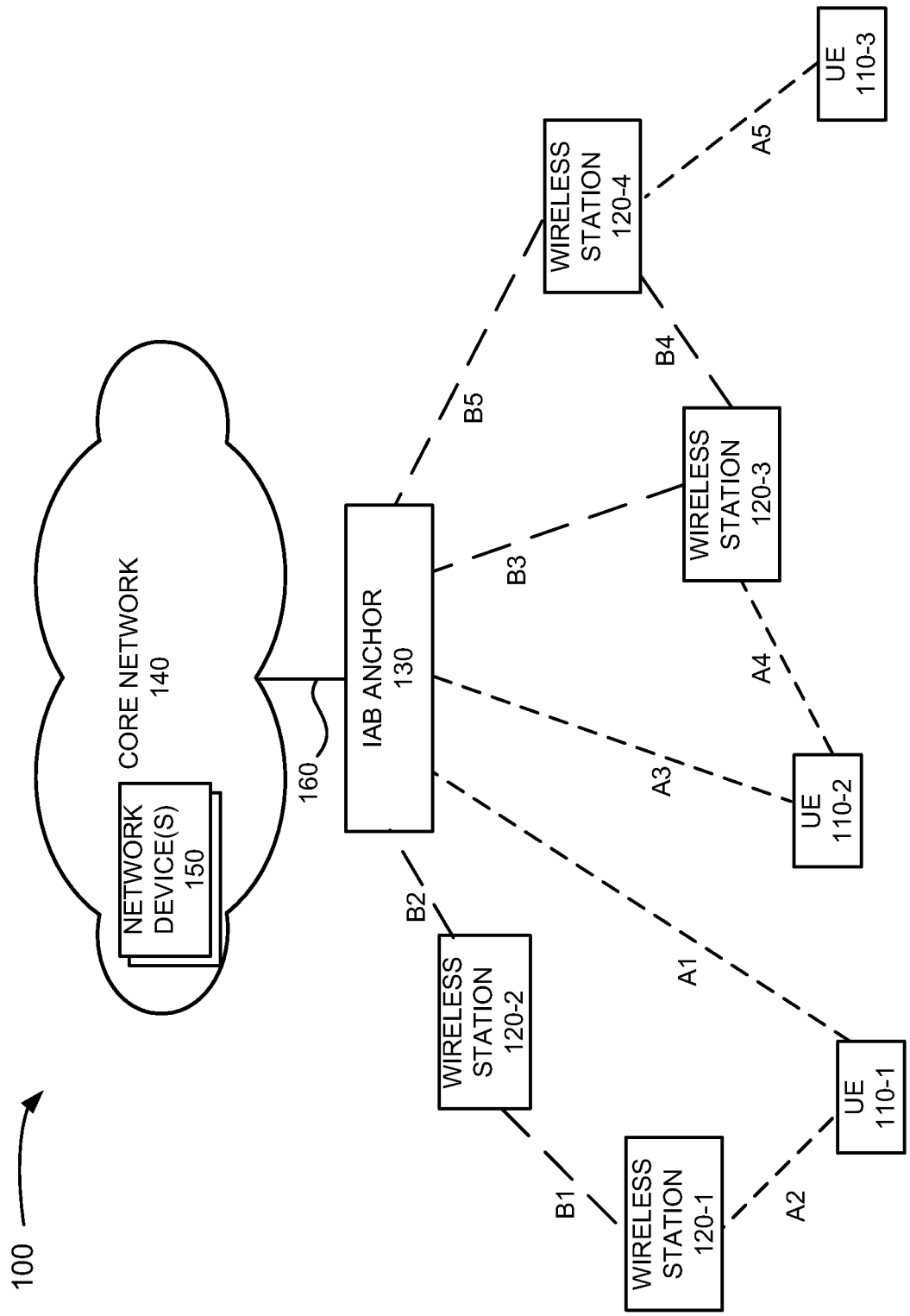
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 may include user equipment (UE) devices 110-1 through 110-3 (referred to herein individually as UE device or UE 110, and collectively as UE devices or UEs 110), wireless stations 120-1 through 120-4 (referring to herein individually as wireless station 120 and collectively as wireless stations 120), integrated access and backhaul (IAB) anchor 130, core network 140, network devices 150 and link 160. The dashed lines A1-A4 represent wireless access links from UEs 110 and dashed lines B1-B5 represent wireless backhaul links from wireless stations 120.

UEs 110 may each include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UEs 110 may be implemented as a machine-type communications (MTC) device, an Internet of Things (IoT) device, a machine-to-machine (M2M) device, etc., that includes communication functionality, such as a home appliance device, a home monitoring device, a camera, etc. UEs 110 may connect to wireless stations 120 in a wireless manner. UE 110 and the person associated with UE 110 (e.g., the party holding or using UE 110) may be referred to collectively as UE 110 in the description below.

In an exemplary implementation, UEs 110 may use wireless channels to communicate with wireless stations 120. The wireless channels may correspond, for example, to a physical layer in accordance with different radio access technology (RAT) types. For example, wireless channels may correspond to physical layer associated with Fifth Generation (5G) New Radio (NR) standards. In other implementations, the wireless channels may correspond to physical layers associated with Fourth Generation (4G), 4.5G or other air interfaces. In an exemplary implementation, UEs 110 may be 5G-capable devices that provide voice communication, mobile broadband services (e.g., video streaming, real-time gaming, high speed Internet access etc.), best effort data traffic, and/or other types of applications via a 5G NR service using millimeter wave (mmWave) radio frequencies.

Wireless stations 120 (sometimes referred to as base stations, relays or IAB nodes) may each include a network device that has computational and wireless communication capabilities. Wireless stations 120 may each include a transceiver system that connects UE device 110 to other components of a radio access network (RAN) and core network 140 using wireless and/or wired interfaces. In one implementation, wireless station 120 may be a 5G capable device, such as a next generation Node B (gNodeB or gNB), configured to receive 5G communications over a RAN. In such implementations, wireless stations 120 may include one or more radio frequency (RF) transceivers (also referred to as cells and/or base station sectors) facing particular directions. For example, wireless stations 120 may include three RF transceivers and each RF transceiver may service a 120° sector of a 360° field of view. Each RF transceiver may also include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element.

In other implementations, wireless stations 120 may include an evolved Node B (eNodeB or eNB), an evolved LTE (eLTE) eNB, a radio network controller (RNC), a remote radio head (RRH), a baseband unit (BBU), a small cell node (e.g., a picocell node, a femtocell node, a microcell node, a repeater, a relay, etc.), or another type of wireless station/node that provides wireless access to/from UEs 110 and other wireless stations 120.

Wireless stations 120 may be configured to communicate in environment 100 in a hop-by-hop manner until reaching IAB anchor 130. For example, wireless stations 120 may be part of a RAN connecting UEs 110 to IAB anchor 130. Wireless stations 120 may forward data received from UEs 110, as well as data received from other wireless stations 120 to IAB anchor 130. Wireless stations 120 may communicate with each other over wireless channels and/or wired channels. For example, in some instances, one or more wireless stations 120 may be configured to communicate via wired connections, such as fiber optic cables. In such implementations, wireless stations 120 may use wired connections to communicate with other wireless stations 120 when wireless communications are not available (e.g., a line of sight is not available between wireless stations 120).

IAB anchor 130, also referred to as an IAB donor 130 or anchor station, may include one or more computing devices or systems that are part of a wireless station that acts as an interface between the RAN associated with UEs 110 and wireless stations 120, and core network 140. The term "IAB anchor 130" or "anchor station 130" should be construed to include any base station that aggregates data from wireless stations 120 and/or UEs 110 and connects to core network 140 via a wired connection 160, such as via a fiber connection. In an exemplary implementation, IAB anchor 130 may include some similar elements/components as wireless stations 120. For example, IAB anchor 130 may include one or more RF transceivers facing particular directions, such as three RF transceivers and each RF transceiver may service a 120° sector of a 360° field of view. Each RF transceiver may also include an antenna array that includes an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. IAB anchor 130 may also connect to core network 140 via link 160. In an exemplary implementation, link 160 may be a fiber optic link.

Core network 140 may include one or more wired, wireless and/or optical networks that are capable of receiving and transmitting data, voice and/or video signals. For example, core network 140 may include a local area network (LAN), a wide area network (WAN), a metropolitan area network (MAN), an optical network, a cable television network, a satellite network, a wireless network (e.g., a code division multiple access (CDMA) network, a general packet radio service (GPRS) network), an ad hoc network, a telephone network (e.g., the Public Switched Telephone Network (PSTN) or a cellular network), an intranet, the Internet or a combination of networks capable of transmitting data. In one implementation, core network 140 provides packet-switched services and wireless Internet protocol (IP) connectivity to various components in environment 100, such as UEs 110, to provide, for example, data, voice, and/or multimedia services. In some implementations, core network 140 may include a network for delivering IP multimedia services and may provide media flows between UE device 110 and external IP networks (not shown in FIG. 1).

According to an exemplary implementation, core network 140 may include a core 5G NR network. In such an implementation, core network 140 may include various network devices 150 that implement or host network functions, such as a user plane function (UPF), a session management function (SMF), a core access and mobility management function (AMF), a unified data management (UDM), policy control function (PCF), an authentication server function (AUSF), a network slice selection function (NSSF), as well as other network elements associated with billing, security, authentication and authorization, network policies, subscriber profiles, network slicing. In other implementations, core network 140 may include a 4G core network.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110, wireless stations 120 and IAB anchors 130, as well as multiple core networks 140. In addition, environment 100 may include additional elements, such as switches, gateways, routers, monitoring devices, etc., that aid in routing data to/from UEs 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
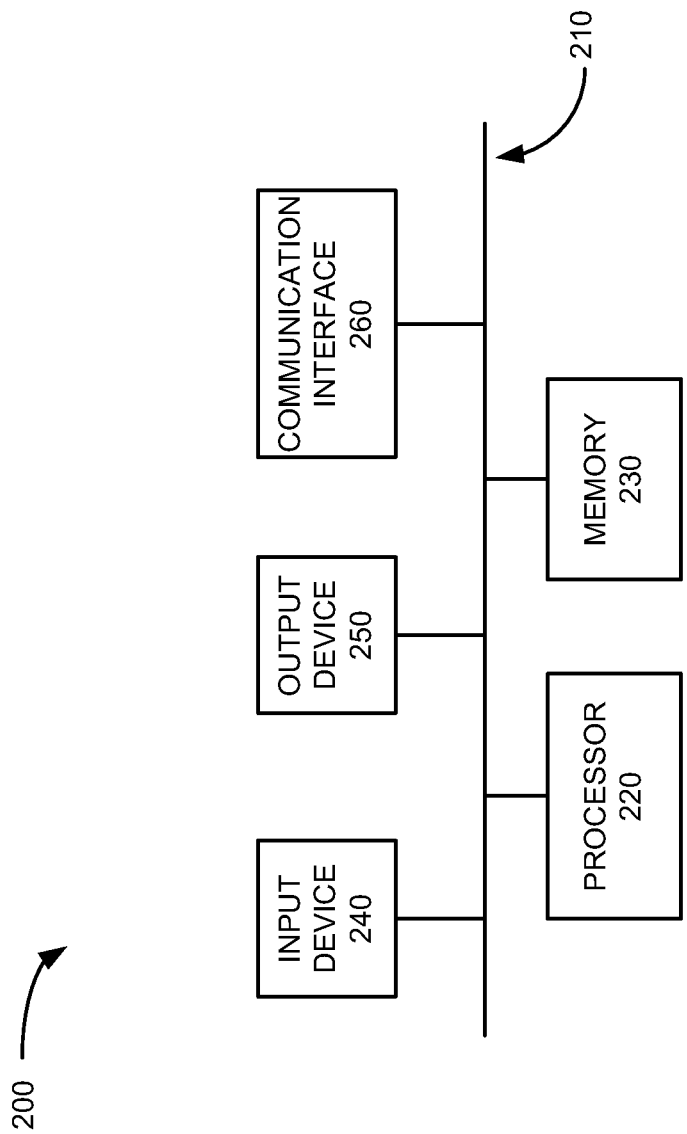
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UE 110, wireless station 120, IAB anchor 130, network devices 150 and/or other devices included in environment 100. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for simplicity. It should be understood that device 200 may include more or fewer components than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), an SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
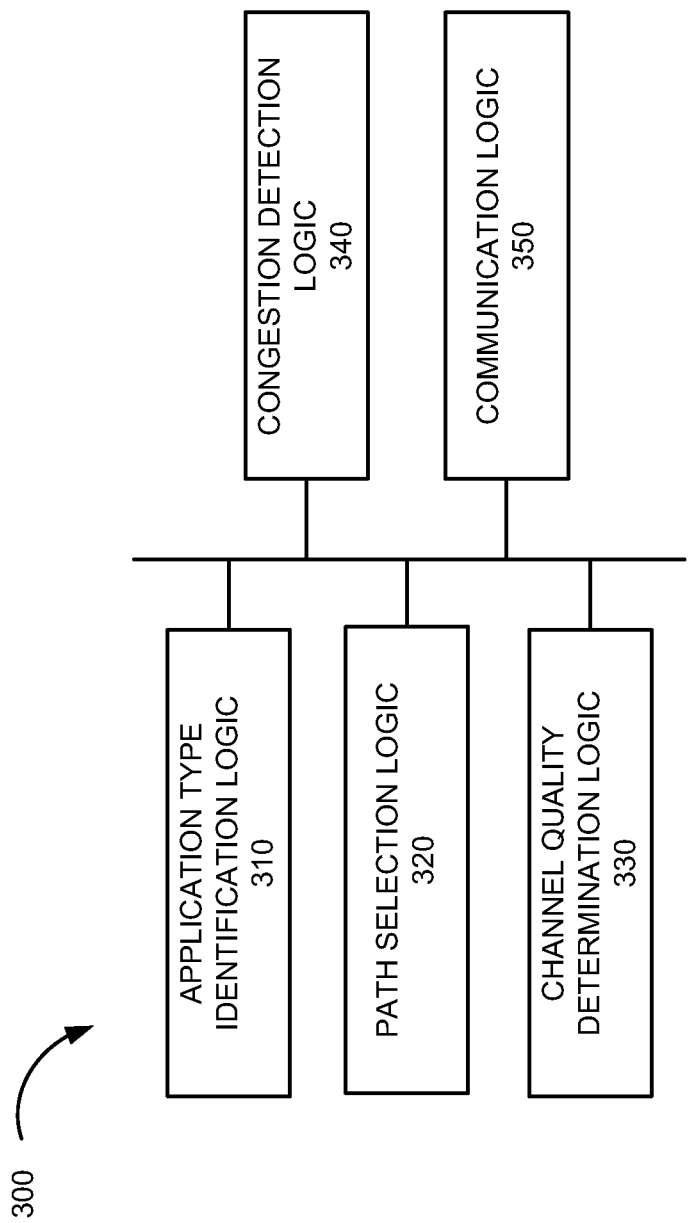
FIG. 3 illustrates exemplary logic components implemented in a device or module in the environment of FIG. 1 in accordance with an exemplary implementation.

FIG. 3 is a functional block diagram of a device 300, also referred to as module 300. Module 300 may be implemented by processor 220 executing instructions stored in memory 230 of IAB anchor 130. In other implementations, module 300 may be implemented externally with respect to IAB anchor 130, such as in core network 140. For example, module 300 may be implemented by processor 220 executing instructions stored in memory 230 of one or more network devices 150. Referring to FIG. 3, module 300 includes application type identification logic 310, path selection logic 320, channel quality determination logic 330, congestion detection logic 340 and communication logic 350. In an exemplary implementation, module 300 may monitor and analyze performance variables, such as channel quality (e.g., signal-to-noise ratio (SNR) and congestion (e.g., throughput on links) for wireless access links and wireless backhaul links in environment 100 in real time or near real time. For example, module 300 may update link performance statistics every predetermined period of time to provide current IAB backhaul conditions.

Application type identifying logic 310 may include one or more logic devices to identify a type of application being executed by UE 110. For example, application type identifying logic 310 may determine that UE 110 is executing an email program, a streaming video application, a messaging application, etc. Application type identifying logic 310 may categorize the type of application as being a real time application or a non-real-time application. For example, application type identification logic 310 may categorize the email program as a non-real time application, and categorize a streaming video application and a messaging application as real time applications.

In some implementations, application type identification logic 310 may also identify if a UE 110 has a service level agreement (SLA) or quality of service (QoS) agreement with the service provider associated with IAB anchor 130 and core network 140. In such implementations, application type identification logic 310 may assign all applications for UE 110 having an SLA or QoS agreement with the service provider as being real time applications. In this manner, a subscriber associated with UE 110 may obtain faster service with less delay, jitter, etc., when executing applications.

Path selection logic 320 may include one or more logic devices to identify possible paths from UEs 110 to IAB anchor 130. For example, referring to FIG. 1, path selection logic 320 may identify that UE 110-1 has two paths to IAB Anchor 130—the first path being a direct path via wireless link A1; and the second path including link A2 to wireless station 120-1, a backhaul link B1 from wireless station 120-1 to wireless station 120-2 and a backhaul link B2 from wireless station 120-2 to IAB anchor 130. UE 110-2 may have three paths to IAB anchor 130—the first path being a direct path via wireless link A3; the second path being via link A4 to wireless station 120-3 and a backhaul link B3 from wireless station 120-3 to IAB anchor 13; and the third path being via link A4 to wireless station 120-3, backhaul link B4 from wireless station 120-3 to wireless station 120-4 and backhaul link B5 from wireless station 120-4 to IAB anchor 130. In an exemplary implementation, path selection logic 320 may store the paths to IAB anchor 130 during configuration of the RAN associated with wireless stations 120 or may identify the particular paths in real time when a UE 110 is attempting to connect to one of wireless stations 120. In each case, path selection logic 320 may select the particular path for each UE 110 to use to connect to IAB anchor 130, as described in detail below.

Referring back to FIG. 3, channel quality determination logic 330 may include logic to determine the channel quality associated with each link in the paths from UEs 110 to IAB anchor 130. For example, channel quality determination logic 330 may determine the signal-to-noise ratio (SNR) for each link in a path from UE 110 to IAB anchor 130. In some implementations, channel quality determination logic 330 may determine whether the SNR is greater than or equal to a minimum SNR. The minimum SNR may be different for real time traffic versus non-real time traffic. For example, channel quality determination logic 330 may define SNRmin_R for real time traffic and SNRmin_NR for non-real time traffic. If the SNR for a link is below the minimum SNR (either SNRmin_R or SNRmin_NR), data transmission on the link may not be possible and/or be of poor quality. As an example, the minimum SNR for voice communications may be 25 decibels (dB), and the minimum SNR for data may be 18 dB.

In other implementations, channel quality determination logic 330 may use metrics other than SNR to measure or detect channel quality. For example, channel quality determination logic 330 may use a channel quality indicator (CQI) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or using another measure of signal strength or quality. In each case, channel quality determination logic 330 may determine a channel quality metric associated with the signal quality of a particular link or channel.

Congestion detection logic 340 may include logic to detect the data congestion for each link in the paths from UE 110 to IAB anchor 130. For example, IAB anchor 130 may check the congestion level on each link before selecting the optimal path since if a link is congested, the link may cause delays and even drop packets. In an exemplary implementation, the congestion level may be estimated by analyzing the throughput level. For example, if a link has a throughput capacity set to the value 10, and the current throughput on the link is 9.5 or 10, congestion detection logic 340 may determine that the link is congested or becoming congested. If, however, congestion detection logic 340 determines that the throughput on the link has a current value of 4, congestion detection logic 340 may determine that there is no congestion and that the link has the capacity to handle traffic from other UEs 110.

Similar to SNR, in an exemplary implementation, congestion detection logic 340 may define different maximum levels of throughput (TP) for real time applications and non-real time applications. For example, congestion detection logic 340 may define TPmax_R as the maximum throughput for real time traffic and define TPmax_NR as the maximum throughput for non-real time traffic. Congestion detection logic 340 may determine that the link satisfies the throughput threshold for real time traffic if the throughput on the link is below TPmax_R. If, however, congestion detection logic 340 determines that the throughput on the link is greater than TPmax_R, congestion detection logic 340 determines that the link is congested and the link may not be suitable for use (e.g., loss of data can be expected).

In an exemplary implementation, a service provider may set the values of TPmax_R and TPmax_NR depending on the particular situations. For example, a service provider associated with IAB anchor 130 may set TPmax_R to 8.0 on the link with a capacity of 10 to provide enough capacity for real time applications. Alternatively, the service provider may set TPmax_R to 7.0 on the link with a capacity of 10 to be more conservative with respect to avoiding congestion in environment 100. For non-real time applications, the service provider may set TPmax_NR, for example, to 9.5 on a link with a capacity of 10 since non-real time applications are not as critical with respect to loss of data and/or delay.

Communication logic 350 may include logic for communicating with devices in environment 100. For example, communication logic 350 may include one or more transceivers to transmit data to and receive data from UEs 110, wireless stations 120, IAB anchor 130 and/or network devices 150, as well as other devices in core network 140 via wired, wireless or optical mechanisms. For example, communication logic 350 may include one or more RF one or more antennas for transmitting and receiving RF data. Communication logic 530 may also include a modem or an Ethernet interface to a LAN or other mechanisms for communicating with elements in environment 100.

Although FIG. 3 shows exemplary components of module 300, in other implementations, module 300 may include fewer components, different components, differently arranged components, or additional components than depicted in FIG. 3. In addition, in some implementation, various functions described as being performed by module 300 may be performed by other devices located externally with respect to module 300.

Figure 4:
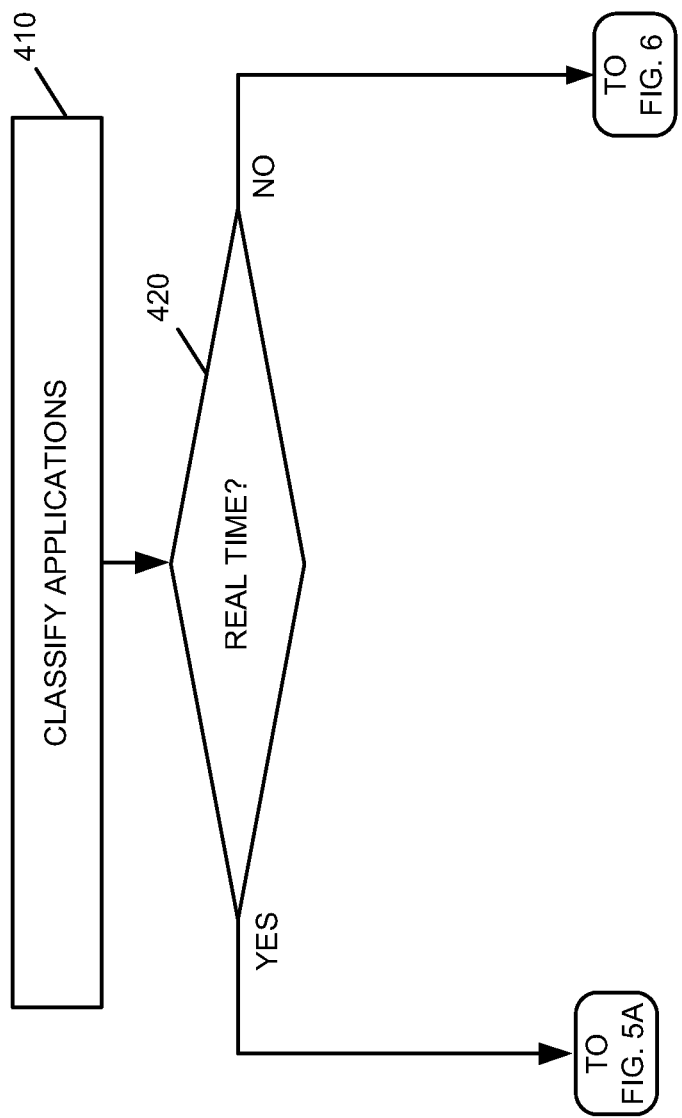
FIG. 4 is a flow diagram illustrating processing in the environment of FIG. 1 in accordance with an exemplary implementation.

FIG. 4 is a flow diagram illustrating processing associated with environment 100 in accordance with an exemplary implementation. Processing may begin with module 300 classifying particular types of applications (block 410). For example, application type identification logic 310 may identify applications as being either real time or non-real time applications. As an example, application type identification logic 310 may identify applications that do not have to be executed in real time, such as an email application, a web browsing application, a file transfer application, etc., as non-real time applications Application type identification logic 310 may also identify applications that should be executed in real time, such as a video streaming application, a voice call application, an emergency or mission critical services related application, as real time applications. Application type identification logic 310 may further identify any SLA or QoS agreement associated with particular UEs 110. In such cases, all applications executed by UE 110 may be categorized as real time applications. Application type identification logic 310 may store the various types of applications and their corresponding real time or non-real time category information.

Assume that UE 110-2 is executing an application and attempting to establish a connection with core network 140. Application type identification logic 310 determines if the currently executing application is a real time application (block 420). If the application is a real time application (block 420—yes), path selection logic 320 may perform processing associated with real time applications, as illustrated in FIGS. 5A and 5B.

Figure 5A:
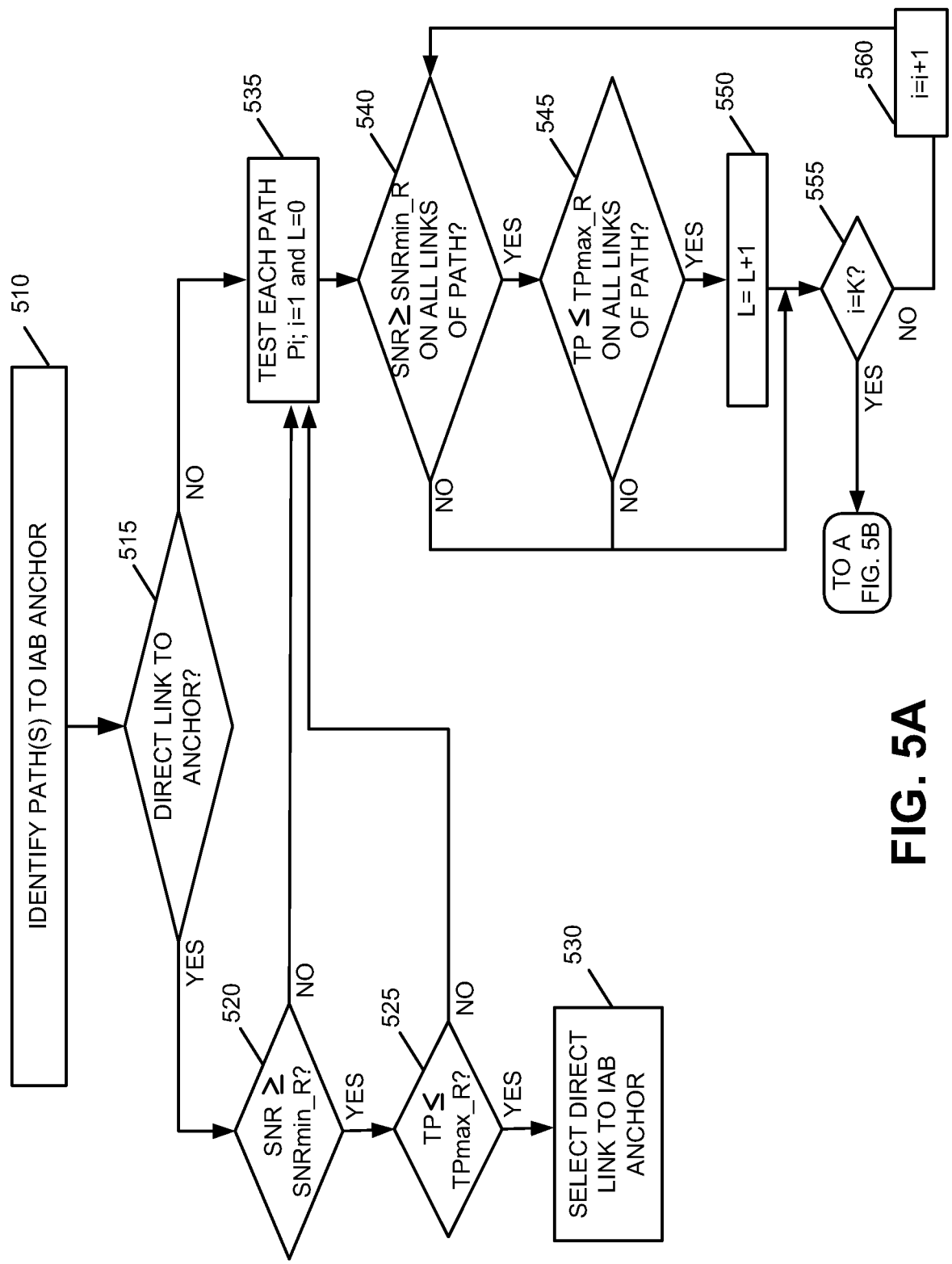
FIGS. 5A and 5B are flow diagrams illustrating processing associated with selecting a path associated with a user equipment device executing a real time application in accordance with an exemplary implementation.
Figure 5B:
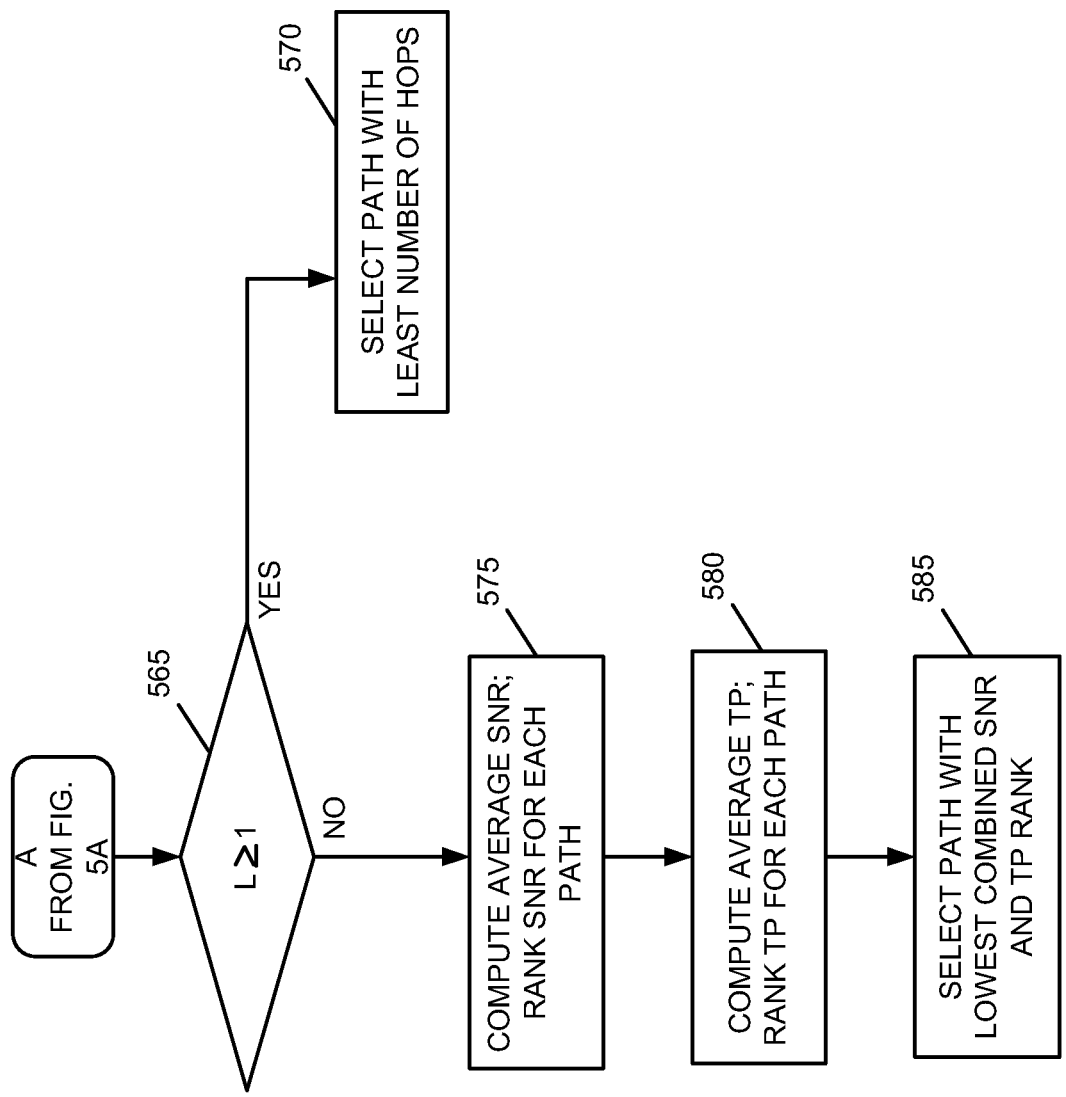

FIGS. 5A and 5B are flow diagrams illustrating processing associated with environment 100 with respect to identifying paths to IAB anchor 130 for UEs 110 executing real time applications. Processing may begin by identifying paths to IAB anchor 130 (block 510). For example, continuing with the example above in which UE 110-2 is attempting to connect with core network 140 and referring to FIG. 1, path selection logic 320 may determine that UE 110-2 includes three paths—the first path being a direct connection via link A3; the second path being via links A4 and B3; and the third path being via links A4, B4 and B5.

Path selection logic 320 may then determine if any of the paths include a direct like to IAB anchor 130 (block 515). For example, UE 110-2 has a direct link to IAB anchor 130 via link A3, while UE 110-3 does not include a direct link to IAB anchor 130. In this example, since UE 110-2 has a direct link to IAB anchor 130 (block 515—yes), channel quality determination logic 330 may measure the channel quality of link A3, such as SNR associated with link A3. In one implementation, channel quality determination logic 330 may determine if the SNR is greater than or equal to a minimum SNR value associated with a real time SNR threshold (e.g., SNR SNRmin_R). The minimum SRN real time threshold SNRmin_R is based on an SNR level that provides UE 110-2 with a good quality communication link for real-time communications.

If the SNR value associated with the direct link A3 is greater than or equal to the minimum threshold (block 520—yes), congestion detection logic 340 may measure the throughput of the direct link. For example, congestion detection logic 340 may determine if the throughput of link A3 is less than or equal to the maximum throughput rate (e.g., TPmax_R) allowed for real-time applications (block 525).

If congestion detection logic 340 determines that the throughput is less than or equal to the maximum real time throughput rate or value (block 525—yes), path selection logic 320 selects the direct link as the optimal path to IAB anchor 130 (block 530). That is, in this example, path selection logic 320 selects link A3 as the link for UE 110-2 to use when communicating with IAB anchor 130 to access core network 140 while using an application classified as a real time application.

If, however, channel quality determination logic 320 determines that the SNR of the direct link is not greater than or equal to SNRmin_R (block 520—no), or congestion detection logic 340 determines that the throughput of the direct link is not less than or equal to TPmax_R (block 525—no), module 300 may test each path to IAB anchor 130 (block 535). For example, for each path Pi from UE 110-2 to IAB anchor 130, device 300 may test the SNR and TP of each link in each path.

For example, channel quality determination logic 330 may measure the SNR associated with each of links A4 and B3 that form a path from UE 110-2 to IAB anchor 130 and determine if the SNR for each link is greater than or equal to SNRmin_R (block 540). If the SNR value associated with each link is greater than or equal to SNRmin_R (block 540—yes), congestion detection logic 340 may measure the throughput of each of links A4 and B3. For example, congestion detection logic 340 may determine if the throughput of each of links A4 and B3 is less than or equal to TPmax_R (block 545). If congestion detection logic 340 determines that the throughput is less than or equal to the maximum real-time throughput value (block 545—yes), path selection logic 320 may increment a variable L that is originally set to zero and corresponds to the number of paths that meet the channel quality and throughput requirements by one (i.e., L=L+1) (block 550).

If, however, the SNR of either link A4 or B3 is not greater than or equal to SNRmin_R (block 540—no), or the throughput of either link A4 or B3 is not less than or equal to TPmax_R (block 545—no), module 300 may not increment L. In each case (i.e., the SNR of each link is greater than or equal to SNRmin_R and the throughput is less than or equal to TPmax_R, or the channel quality or throughput do not meet the thresholds), module 300 may determine if all the paths have been tested, such as whether i=K, where K is the total number of paths from UE 110-2 to IAB anchor 130 (block 555). If i does not equal K (block 555—no), module 300 may increment i by 1 (block 560) and processing returns to block 540. Module 300 may then test the next path, such as the path from UE 110-2 that includes links A4, B4 and B5. That is, module 300 measures the SNR and TP as described above with respect to blocks 540 and 545 and repeats the process for each of the paths from UE 110-2 to IAB anchor 130 until all the paths from UE 110-2 to IAB anchor 130 are tested. If, however, i is equal to K, indicating that all paths have been tested (block 555—yes) module 300 may determine if L is greater than or equal to 1 (FIG. 5B, block 565). That is, module 300 determines if at least one path meets the channel quality and throughput requirements associated with real time communications.

If L is greater than or equal to 1 (block 565—yes), path selection logic 320 may select the path from UE 110-2 to IAB anchor 130 with the least number of hops (block 570). For example, if both paths A4, B3 and A4, B4, B5 meet the signal quality and throughput requirements, path selection logic 320 selects the path including links A4 and B3 since that path has two links as compared to the other path that includes three links. In situations in which multiples paths meet the signal quality and throughput requirements and the multiple paths have the same number of links, path selection logic 320 may select the particular path in a random manner. Alternatively, if multiple paths have the same number of links, path selection logic 320 may select the path in which a lowest performing link in the path with respect to channel quality and congestion has the highest SNR and lowest throughput with respect to the lowest performing links in the other paths. This may avoid selecting a path in which one or more of the links is of particularly poor signal quality or is heavily congested.

If, however, L is not greater than or equal to 1 (block 565—no), path selection logic 320 may compute an average the SNR for each path and rank the average SNR ratios from 1 to N (block 575). For example, path selection logic 320 may average the SNR ratios for links A4 and B3 and links A4, B4 and B5. The path with the highest SNR will be assigned a value of 1 and the paths with lower SNRs will be assigned values from 2 to N based on their particular SNRs.

Path selection logic 320 may also compute the average throughput (TP) for each path and rank the average TPs for each path from 1 to N (block 580). For example, path selection logic 320 may average the TP values for links A4 and B4 and links A4, B4 and B5. The path with the lowest average TP value will be assigned a value of 1 and the paths with higher TP values will be assigned values from 2 to N based on their particular TPs.

Path selection logic 320 may then add the SNR rankings and TP rankings for each path and select the path having the lowest combined SNR and TP rank (block 585). For example, assume that path including links A4, B4 and B5 has a rank of 1 for SNR and 2 for TP for a total value of 3. Further assume, that the path including links A4 and B3 has a rank of 3 for SNR and 1 for TP for a total value of 4. In this case, path selection logic 320 selects the path from UE 110-2 to IAB anchor 130 that includes links A4, B4 and B5 as the path to use when UE 110-2 is communication with IAB anchor 130 since the path with links A4, B4 and B5 has the lowest combined SNR and TP rank.

In some implementations, path selection logic 320 may apply weighting factors to the SNR and TP rankings. For example, path selection logic 320 may apply a weighting factor of 1.5, 2, etc., to the SNR rankings. In such a case, the service provider may effectively weight SNR as more important than throughput when selecting a path to IAB anchor 130. Alternatively, path selection logic 320 may apply the higher weighting factor to the TP ranking. In each case, path selection logic 320 may select the path having a lowest or minimum combined SNR and TP rankings than the other paths that satisfy the SNR and TP thresholds.

In still other implementations, if L is not greater than or equal to one, path selection logic 320 may select a path in which the lowest performing link in the path with respect to channel quality and congestion has the highest SNR and lowest throughput as compared to the lowest performing links in the other paths. This may avoid selecting a path in which one or more of the links is of particularly poor signal quality or is heavily congested.

Referring back to FIG. 4, assume that UE 110-2 is attempting to establish connections with core network 140 for an application executing on UE 110-1. Further assume that the application is a non-real time application, such as a web browsing application. In this case, application type identification logic 310 determines that the application is not a real time application (block 420—no), module 300 may then execute a non-real time process for identifying the appropriate path from UE 110-2 to IAB anchor 130, as described below.

Figure 6:
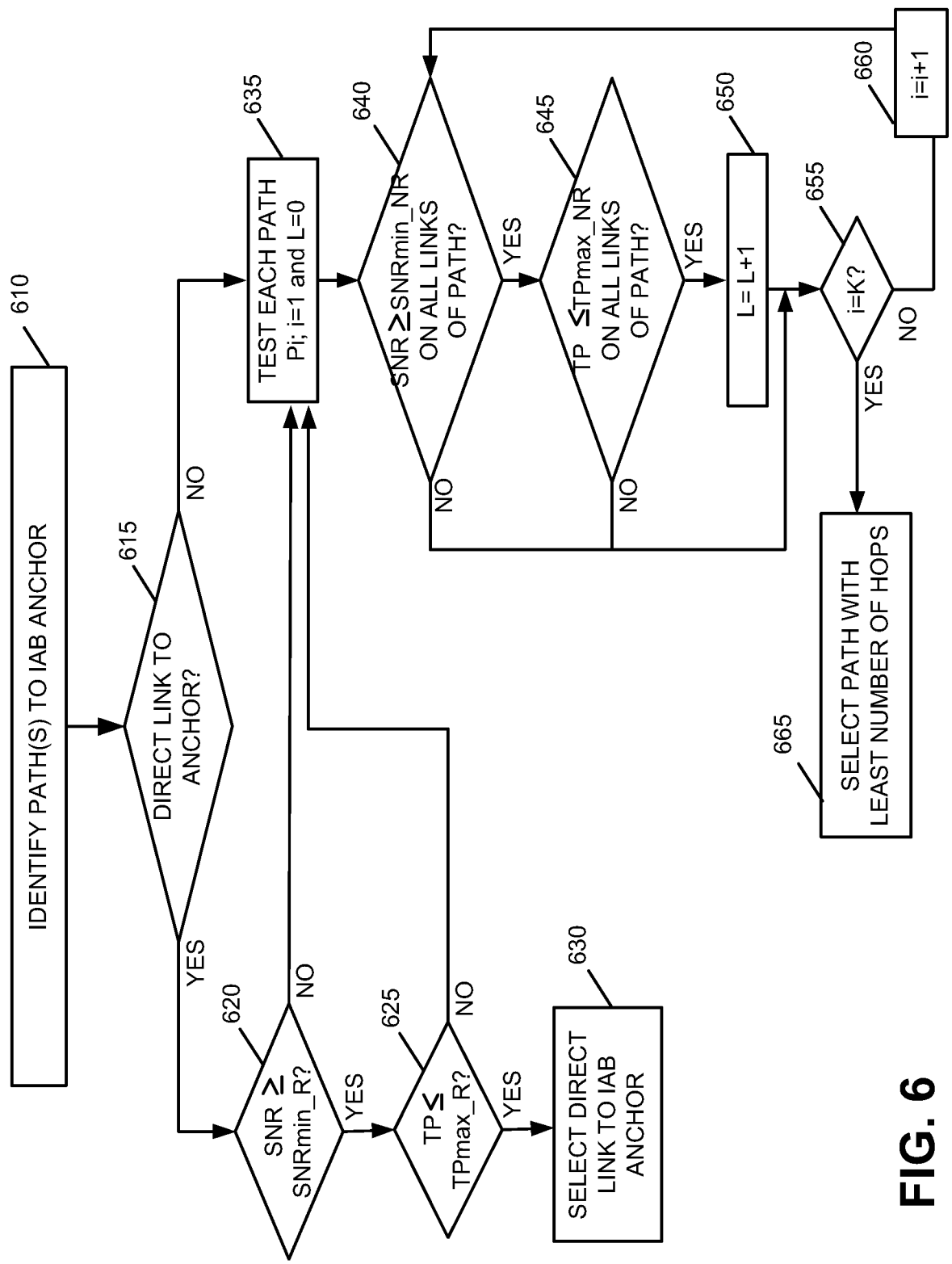
FIG. 6 is a flow diagram illustrating processing associated with selecting a path associated with a user equipment device executing a non-real time application in accordance with an exemplary implementation.

FIG. 6 is a flow diagram illustrating processing associated with environment 100 with respect to identifying paths to IAB anchor 130 for UEs 110 executing non-real time applications. In an exemplary implementation, module 300 may perform a similar process as that described above with respect to performing processing for real time applications discussed above with respect to FIG. 5A.

Continuing with the example of UE 110-2 attempting to access core network 140 for a web browsing application, path selection logic 320 may identify paths from UE 110-2 to IAB anchor 130 and their corresponding links (block 610) and determine if there is a direct link to IAB anchor 130 (block 615). If a direct link exists (block 615—yes), channel quality determination logic 330 may determine if the SNR for each link is greater than or equal to SNRmin_NR (block 620) and congestion detection logic 340 may determine if the TP for each link is less than or equal to TPmax_NR (block 625). As discussed above, the SNRmin_NR for non-real time applications may be lower than for real time applications. In addition, TPmax_R may be higher for non-real time application than for real time applications. If the SNR and TP for each link satisfy the threshold levels, path selection logic 320 may select the direct link as the path from UE 110-2 to IAB anchor 130.

If, however, there is no direct link to IAB anchor 130 (block 615—no) or the SNR or TP of each link does not satisfy the respective signal quality and throughput requirements (block 620—no; or block 625—no), module 300 may test each path from UE 110-2 to IAB anchor 130 in a similar manner as described above with respect to FIG. 5A. That is, module 300 may test each path i from UE 110-2 to IAB anchor 130 (block 635). For example, channel quality determination logic 330 may test whether the SNR for each link in a path is greater than or equal to SNRmin_NR (block 640) and congestion detection logic 340 may test each link in a path to determine whether the TP is less than or equal to TPmax_NR (block 645). If SNRmin_NR is greater than or equal to SNRmin_NR (block 640—yes) and TP is less than or equal to TPmax_NR (block 645—yes), path selection logic 320 may increment L by one (block 650). If the SNR for each link in the path is not greater than or equal to SNRmin_NR (block 640—no) or the TP for each link in the path is not less than or equal to TPmax_NR (block 645—no), L may not be incremented and path selection logic 320 may determine if all the paths have been checked (i.e., whether i=K) (block 655). If all the paths have not been checked (block 655—no), path selection logic 320 may increment i (block 660) and processing may return to block 640 to check the next path from UE 110-2 to IAB anchor 130. If, however, all the paths have been checked (i=K) (block 655—yes), path selection logic 320 may select the path with the least number of hops (block 665). In situations in which multiples paths meet the signal quality and throughput requirements and the multiple paths have the same number of links, path selection logic 320 may select the particular path in a random manner. Alternatively, if multiple paths have the same number of links, path selection logic 320 may select the path in which a worst link in the path with respect to channel quality and congestion has the highest SNR and lowest throughput. This may avoid selecting a path in which one or more of the links is of particularly poor signal quality or is heavily congested.

Implementations described herein provide systems and methods for selecting optimal paths from UE devices to an IAB anchor station while taking into consideration signal quality on links in the paths, congestion on links in the path, the number of links/hops in the path, the type of application being executed, SLA and QoS agreements. This allows a service provider to provide wireless backhaul in an efficient manner. In addition, the path selection process may identify possible problems in a network and route traffic around such problems, thereby improving a customer's satisfaction and user experience.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to module 300 performing various path selection functions. In various implementations, module 300 may be located in the RAN associated with IAB anchor 130, within IAB anchor 130 or externally with respect to the RAN and IAB anchor 130, such as within core 140.

In addition, features have been described above with respect to UEs 110 executing real time applications or non-real time applications. In some implementations, a UE 110 may be executing both a real time application and a non-real time application at the same time, such as executing a video streaming application in the background while executing an email application in the foreground. In such a situation, application type identification logic 310 may identify UE 110 as executing a real time application and processing will proceed as described above with respect to FIGS. 5A and 5B. In this case, both real time and non-real time applications may use the same path to IAB anchor 130.

Further, while series of acts have been described with respect to FIGS. 4, 5A, 5B and 6, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
 identifying a first path from a user equipment (UE) device to an anchor station;
 determining that the first path corresponds to a direct wireless link to the anchor station;
 determining signal quality and congestion associated with the direct wireless link;

selecting, in response to determining that the signal quality satisfies a signal quality threshold and the congestion satisfies a congestion threshold, the first path for the UE device to use when communicating with the anchor station; and identifying, in response to determining that the signal quality does not satisfy the signal quality threshold or the congestion does not satisfy the congestion threshold, at least one other path for the UE device to use when communicating with the anchor station, wherein identifying the at least one other path comprises identifying a second path and a third path from the UE device to the anchor station, wherein each of the second and third paths includes multiple wireless stations and multiple wireless links to the multiple wireless stations; and selecting one of the second path or third path based on at least one of signal quality or congestion associated with each link in the respective second and third paths.

2. The method of claim 1, wherein selecting one of the second path or third path comprises:

determining signal quality and congestion for each link in the second and third paths, determining that the signal quality for each link in the second and third paths satisfies the signal quality threshold and the congestion for each link in the second and third paths satisfies the congestion threshold, and selecting one of the second or third paths based on the signal quality and the congestion for each link in the respective second and third paths.

3. The method of claim 2, further comprising:

determining an average signal quality for each of the second and third paths;

determining an average throughput for each of the second and third paths;

ranking the signal qualities associated with the second and third paths based on the average signal quality for each path; and ranking the throughputs associated with the second and third paths based on the average throughput for each path;

wherein the selecting one of the second or third paths further comprises:

selecting one of the second or third paths based on the rankings.

4. The method of claim 2, wherein the selecting one of the second or third paths comprises:

selecting the path with a least number of links.

5. The method of claim 2, wherein the selecting one of the second or third paths comprises:

applying a weighting factor to at least one of the signal quality or congestion.

6. The method of claim 1, wherein the determining signal quality comprises determining at least one signal quality metric associated with the direct wireless link.

7. The method of claim 1, further comprising:

identifying whether the UE device is executing a real time application or a non-real time application.

8. The method of claim 7, further comprising:

setting at least one of the signal quality threshold or the congestion threshold to different values for the real time application and the non-real time application.

9. The method of claim 1, wherein the anchor station comprises an integrated access and backhaul (IAB) anchor station connected to a core network via a wired connection.

10. A system, comprising:

at least one device comprising a processor, wherein the at least one device is configured to:

determine whether a first path from a user equipment (UE) device to an anchor station corresponds to a direct wireless link to the anchor station, determine, in response to determining that the first path corresponds to a direct wireless link, signal quality and congestion associated with the direct wireless link, select, in response to determining that the signal quality satisfies a signal quality threshold and the congestion satisfies a congestion threshold, the first path for the UE device to use when communicating with the anchor station, identify, in response to determining that at least one of the signal quality does not satisfy the signal quality threshold or the congestion does not satisfy the congestion threshold, at least one other path for the UE device to use when communicating with the anchor station, wherein when identifying the at least one other path, the at least one device is configured to identify a second path and a third path from the UE device to the anchor station, wherein each of the second and third paths includes multiple wireless stations and multiple wireless links to the multiple wireless stations, and select one of the second path or third path based on at least one of signal quality or congestion associated with each link in the respective second and third paths.

11. The system of claim 10, wherein when selecting one of the second path or third path, the at least one device is further configured to:

determine the signal quality and throughput for each link in the second and third paths, determine that the signal quality for each link in the second and third paths satisfies the signal quality threshold and the throughput for each link in the second and third paths satisfies the congestion threshold, and select one of the second or third paths based on the signal quality and throughput for each link in the respective second and third paths.

12. The system of claim 11, wherein the at least one device is further configured to:

determine an average signal quality for each of the second and third paths, determine an average throughput for each of the second and third paths, rank the signal qualities associated with the second and third paths based on the average signal quality for each path, and rank the throughputs associated with the second and third paths based on the average throughput for each path, wherein when selecting one of the second or third paths, the at least one device is further configured to:

select one of the second or third paths based on the rankings.

13. The system of claim 11, wherein when selecting one of the second or third paths, the at least one device is configured to:

select the path with a least number of links.

14. The system of claim 11, wherein when selecting one of the second or third paths, the at least one device is configured to:

apply a weighting factor to at least one of the signal quality or throughput.

15. The system of claim 10, wherein when determining signal quality, the at least one device is configured to:
  determine at least one signal quality metric associated with the direct wireless link.

16. The system of claim 10, wherein the at least one device is further configured to:
  identify whether the UE device is executing a real time application or a non-real time application.

17. The system of claim 16, wherein the at least one device is further configured to:
  set at least one of the signal quality threshold or the congestion threshold to different values for the real time application and the non-real time application.

18. The system of claim 10, wherein the anchor station comprises an integrated access and backhaul (IAB) anchor station.

19. A non-transitory computer-readable medium having stored thereon sequences of instructions which, when executed by at least one processor, cause the at least one processor to:
  determine whether a first path from a user equipment (UE) device to an anchor station corresponds to a direct wireless link to the anchor station;
  determine, in response to determining that the first path corresponds to a direct wireless link, signal quality and congestion associated with the direct wireless link;
  select, in response to determining that the signal quality satisfies a signal quality threshold and the congestion satisfies a congestion threshold, the first path for the UE device to use when communicating with the anchor station;
  identify, in response to determining that at least one of the signal quality does not satisfy the signal quality threshold or the congestion does not satisfy the congestion threshold, at least one other path for the UE device to use when communicating with the anchor station, wherein the instructions to identify the at least one other path cause the at least one processor to identify a second path and a third path from the UE device to the anchor station, wherein each of the second and third paths includes multiple wireless stations and multiple wireless links to the multiple wireless stations; and
  select one of the second path or third path based on at least one of a signal quality or congestion associated with each link in the respective second and third paths.

20. The non-transitory computer-readable medium of claim 19, wherein the instructions to select one of the second path or third path cause the at least one processor to:
  determine signal quality and congestion for each link in the second and third paths; and
  determine that the signal quality for each link in at least one of the second and third paths satisfies the signal quality threshold and the congestion for each link in the second and third paths satisfies the congestion threshold, and
  select one of the second or third paths based on the signal quality and the congestion for each link in the respective second and third paths.

* * * * *